UNITED STATES PATENT OFFICE.

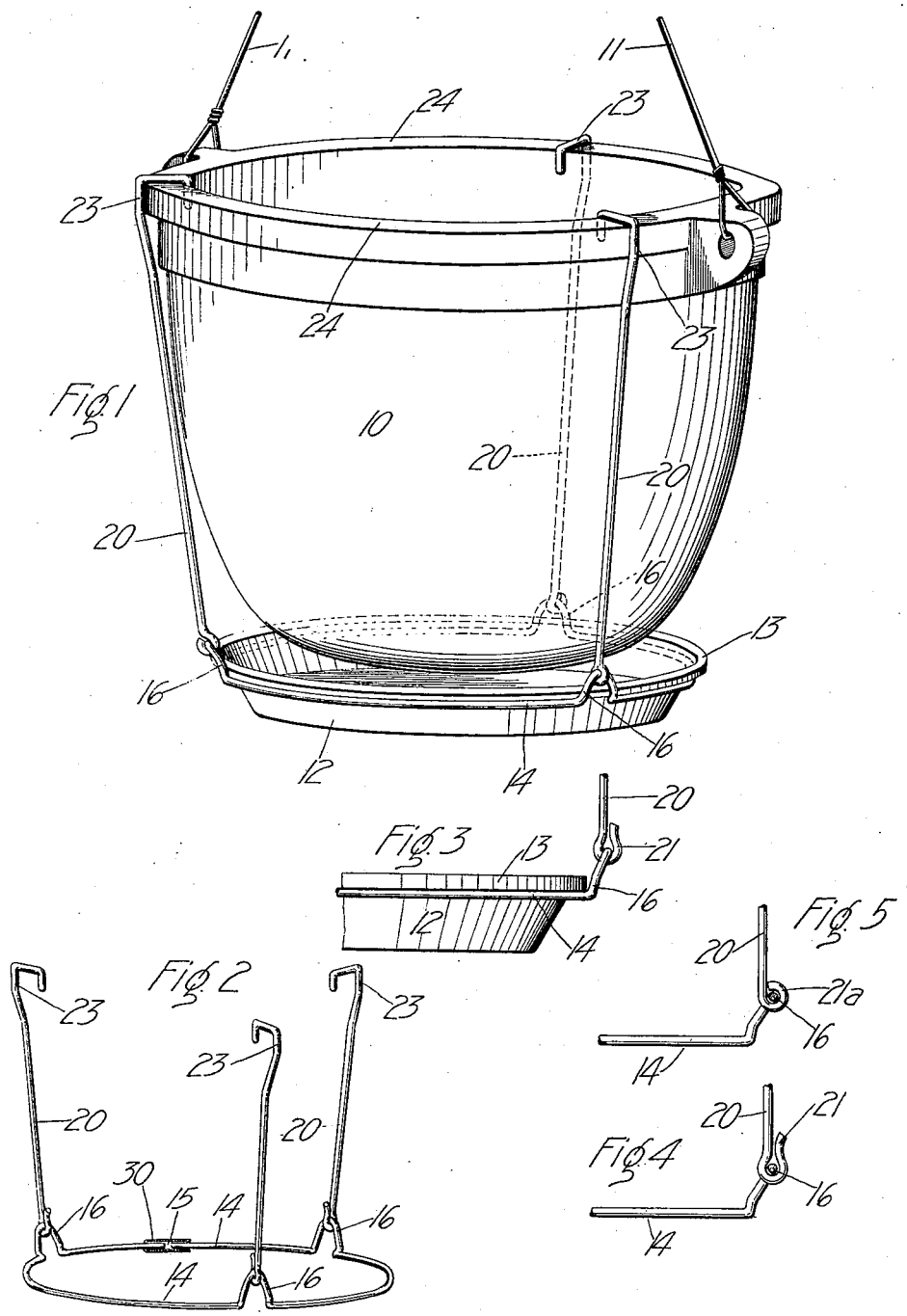

PAUL W. JANNOCH, OF PASADENA, CALIFORNIA.

DRIP-CATCHER HOLDER FOR HANGING BASKETS.

1,095,504.  Specification of Letters Patent.  Patented May 5, 1914.

Application filed August 18, 1913. Serial No. 785,450.

*To all whom it may concern:*

Be it known that I, PAUL W. JANNOCH, a citizen of the United States, residing at Pasadena, in the county of Los Angeles, State of California, have invented new and useful Improvements in Drip-Catcher Holders for Hanging Baskets, of which the following is a specification.

This invention relates to a simple and inexpensive device, artistic in appearance and easy of operation, for holding a drip catcher beneath a hanging basket used for plants and flowers.

The invention consists in a device preferably made of wire bent into suitable shape, although it may be of other material. I employ a supporting ring which is preferably broken or separated at one point so as to be adjusted to varying dimensions of pots. This supporting ring has a plurality of offsets to which are attached supporting members adapted to hook over the upper edge of the hanging basket at their upper ends.

The details of the arrangements will be fully set forth in the following specification, preferred forms of the device being illustrated in the accompanying drawings; in which—

Figure 1 is a perspective showing my improved device in use. Fig. 2 is a perspective showing the device itself. Fig. 3 is a fragmentary side elevation of my device showing how the supporting ring surrounds and fits upon the drip catcher. Fig. 4 is a view showing the means of attachment of the supporting members to the supporting ring. Fig. 5 is a view showing a modified form of the device of Fig. 4.

In the drawings the numeral 10 may designate a hanging basket of any desired design, supported by wires or chains or other supports 11. Beneath the hanging basket there is supported a drip catcher 12, in the form of a terra cotta or metal pan or bowl, or of any other shape or material desired. The drip catcher particularly has a rim 13 as illustrated in the drawings; and a supporting ring 14 is adapted to fit around the drip catcher beneath its rim 13 as is shown in Figs. 1 and 3. The supporting ring 14 is preferably made of wire and is broken at the point 15 so that it may be expanded or contracted to fit varying diameters of the drip catcher. I provide the supporting ring 14 with a plurality of offsets 16, forming loops which project outwardly and diagonally from the supporting ring, beyond the rim 13 thereof as shown in Fig. 3. The vertical supporting members 20 are also preferably made of wire and are formed at their lower ends as is best shown in Figs. 3 and 4, with a spring loop 21 which may be slipped over the offset 16 and as easily slipped off. This provides for the detachment of the device below without the necessity of unhooking from the basket above. Or, as is shown in Fig. 5, the loops 21ª may be made for permanent attachment to the offsets 16. The upper ends of the members 20 are provided with hook formations 23 of a shape to fit neatly over the rim 24 of the basket to which my device is attached. The rim 24 of these baskets may vary considerably in design; and the hook 23 may be made to fit neatly and closely to the upper rim edge of the basket to effect an artistic appearance, and to keep the member 20 as close to the basket as possible.

From the foregoing it will be seen that my device provides a simple, artistic and easily operated device for supporting drip catchers for hanging baskets. The drip catcher may be easily removed for emptying whenever necessary and may be as easily replaced. I make the supporting rings in various sizes to accommodate the different sizes of drip catchers; the adjustability of the ring is intended mainly to fit the ring closely to the drip catcher and to accommodate small variations of size. To cover the ends of the wire ring at the break 15 I may use a small piece of tubing 30, slipped over the ends as shown in Fig. 2.

Having described my invention, I claim:

1. A device of the character described, comprising in combination with a hanging basket and a drip catcher therefor, a supporting ring surrounding the drip catcher and having offsets disposed outwardly away from the drip catcher, said supporting ring being expansible to conform to drip catchers of different diameters, and vertical supporting members attached at their lower ends to said offsets and having hook formations at their upper ends to hook over the upper edge of the hanging basket.

2. A device of the character described, comprising in combination with a hanging basket and a drip catcher having an outwardly projecting rim, a wire supporting ring adapted to surround the drip catcher below its rim, said ring being expansible to conform to drip catchers of different sizes, outwardly and upwardly disposed offsets in said ring forming loops, vertical supporting members of wire having spring loops at their lower ends encircling the offset portions of said supporting ring, and having hook formations at their upper ends to hook over the rim of hanging basket, said members being of such length that the drip catcher is supported in proper spaced relation below the basket, substantially as described.

In witness that I claim the foregoing I have hereunto subscribed my name this 12th day of August 1913.

P. W. JANNOCH.

Witnesses:
JAMES T. BARKELEW,
ELWOOD H. BARKELEW.

Copies of this patent may be obtained for five cents each, by addressing the "Commissioner of Patents, Washington, D. C."